Nov. 16, 1965 S. ROSENBAUM 3,218,511
CONTROL CIRCUIT FOR INCANDESCENT LAMP OR THE LIKE
Filed April 18, 1961
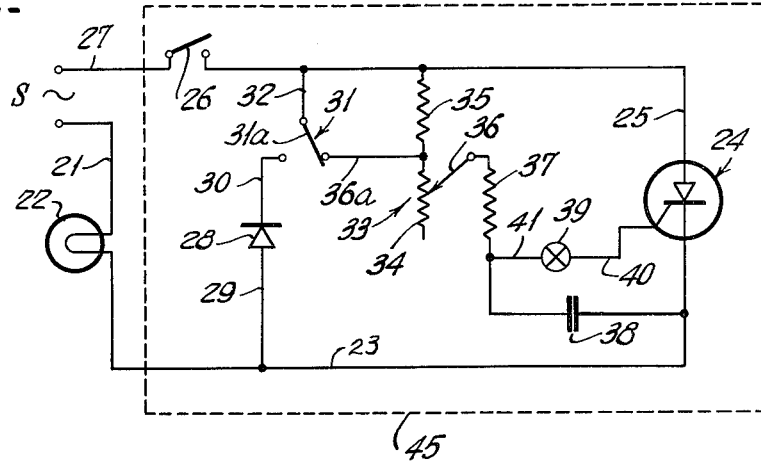
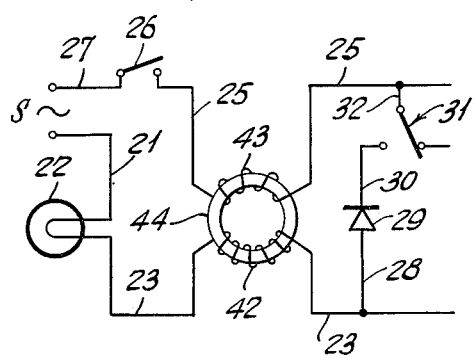
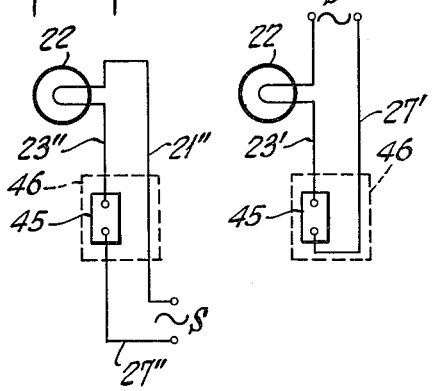
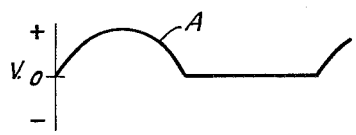
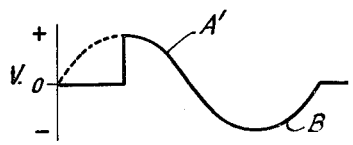
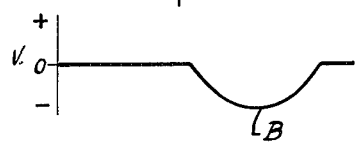
INVENTOR
SAUL ROSENBAUM
BY
Burgess, Ryan & Hicks
ATTORNEYS United States Patent Office 3,218,511
Patented Nov. 16, 1965

1

3,218,511
CONTROL CIRCUIT FOR INCANDESCENT
LAMP OR THE LIKE
Saul Rosenbaum, East Meadow, N.Y., assignor to Leviton
Manufacturing Co., Inc., Brooklyn, N.Y., a corporation of New York
Filed Apr. 18, 1961, Ser. No. 103,882
7 Claims. (Cl. 315—207)

The present invention relates to a new and improved control circuit for varying the output of a resistance type load, such as an incandescent lamp which is connected to a source of alternating current. It relates, more particularly, to a control circuit for varying the level of illumination obtained from one or more incandescent lamps which are connected to a source of alternating current.

An object of the invention is to provide a control circuit by which the level of illumination obtained from a filament type incandescent lamp or a number of such lamps may be varied from zero to a maximum level for the particular lamp or lamps. Another object of the invention is to provide a control circuit of this character which employs relatively inexpensive components and which can be assembled as a unit of such size that it will fit into the usual wall box in place of the customary switch. A further object of the invention is to provide a control circuit for varying the level of illumination obtained from one or more incandescent lamps which can be connected in either a two-wire or a three-wire household wiring system.

A still further object of the invention is to provide a circuit for controlling the level of illumination obtained from one or more incandescent lamps which includes means for minimizing possible interference at radio frequencies when the circuit is in operation.

Other objects and advantages of the present invention will become apparent and will be better understood from the following description and the accompanying drawings in which:

FIG. 1 is a schematic wiring diagram of a control circuit embodying the present invention;

FIG. 2 is a schematic wiring diagram illustrating a modification of the circuit shown in FIG. 1;

FIGS. 3, 3a and 3b are graphic illustrations of various voltage conditions occurring in the operation of the circuit shown in FIG. 1;

FIGS. 4 and 5 are schematic wiring diagrams illustrating the connection of a unit embodying the present invention in two-wire and three-wire wiring systems, respectively.

Briefly, a control circuit embodying the present invention comprises a half-wave controlled rectifier connected in series with a source of A.-C. current and a resistance type load means for varying the output of the controlled rectifier, a half-wave rectifier, and switching means for connecting the said half-wave rectifier in parallel with the controlled rectifier.

Referring now to the drawings in detail, and in particular to FIG. 1, there is a source of alternating current S, one side of which is connected by a wire 21 to one terminal of a single filament incandescent lamp 22. In this regard, it should be noted that the control circuit embodying the present invention can also be employed for regulating the output of a number of such lamps or other non-inductive resistance type loads.

The other terminal of the lamp 22 is connected through wire 23 to the one side of a half-wave controlled rectifier 24. The controlled rectifier employed may be a silicon rectifier of the semi-conductor type having suitable characteristics to operate properly under the particular voltage and current conditions involved. The other side of the controlled rectifier is connected through a wire 25 to a line switch 26 which is in turn connected by a wire 27 to the other side of the source of alternating current.

In addition, one side of a second half-wave rectifier 28 of the dry or semi-conductor type, such as a diode which functions as a half-wave rectifier when an alternating current is applied to it, is connected by a wire 29 to the wire 23 which is connected to the lamp. The other side of the second rectifier is connected by a wire 30 to one terminal of a control switch 31 having a contact arm 31a which is connected by a wire 32 to the wire 25 and thus, through the line switch and the wire 27 to the source of alternating current.

When the contact arm of the control switch connects the wires 30 and 32, the two half-wave rectifiers are connected in parallel and, as indicated, they are connected so that they pass voltages of opposite polarity; i.e., one passes the negative half cycle and the other passes the positive half cycle. Under these conditions, one-half the current supplied to the lamp passes through the half-wave rectifier and the remainder passes through the controlled rectifier. When the switch is in its other position, the half-wave rectifier is not operating and all of the current supplied to the lamp passes through the controlled rectifier.

The amount of current which passes through the controlled rectifier may be varied as desired by means of a circuit which includes a dual potentiometer 33 having two resistance branches 34 and 35 of similar resistance characteristics which are preferably non-linear. The resistance branches of the potentiometer are connected in series at a mid-point in the travel of a movable contact arm 36 and are arranged so that they will be contacted in sequence by the movable contact arm 36. The arm moves from the zero value of the first branch to the maximum value of the second branch, or vice versa, as it passes the mid-point of the potentiometer. The resistance branch 35 is connected to the wire 25 and thus, to the source of the alternating current source. In addition, the mid-point of the potentiometer where the resistance branches join, is connected by a wire 36a to the other terminal of the control switch 31 and thus, to the source of alternating current when the switch is in the position illustrated in FIG. 1. When it is in this position, the control switch shunts the resistance branch of the poteniometer which is connected to the wire 25 and other resistance branch is employed in the circuit for controlling operation of the controlled rectifier.

The movable contact arm of the potentiometer is connected through an R-C network which includes a resistor 37 and a capacitor 38, to the wire 23 on the other side of the controlled rectifier. A voltage, sensitive triggering device 39 is connected by wires 40 and 41 to the gate or control element of the controlled grid rectifier and to the junction between the resistor and the capacitor.

The triggering device 39 is a semi-conductor or other suitable device which becomes conductive at a predetermined voltage which is applied thereto by the discharge on the capacitor. When the triggering device becomes conductive, a voltage is thus applied to the gate of the controlled rectifier which then becomes conductive. After said voltage is applied to the controlled rectifier, it remains conductive for the rest of the half-cycle of the voltage which will be passed by the rectifier. Thus, the time in the cycle at which the controlled rectifier becomes conductive determines the amount of current which will pass through it. This in turn depends on how rapidly the capacitor reaches a voltage sufficient to cause the trigger device to conduct and this will be determined by the setting of the potentiometer. Thus, the potentiometer setting controls the amount of current passing through the controlled rectifier to the lamp.

The capacitor is of the non-polarized type which permits current to pass through it in either direction and in the particular circuit illustrated has a capacitance of from .2 to .3 mfd. The resistance branches of the potentiometer have relatively high resistance values of about 50,000 ohms and the resistor has a value of about 10,000 ohms. As a result, very little current flows through the circuit which regulates operation of the controlled grid rectifier and the resistor limits the current flow when the contact arm of the potentiometer is at the mid-point or junction of the resistance branches.

In operation, the line switch is first closed and the control switch is initially set in the position shown in FIG. 1. Under these conditions, all of the current supplied to the lamp flows through the controlled rectifier and one side of the source of alternating current is connected to the mid-point of the potentiometer. The contact arm of the potentiometer is initially set at the high value end of the resistance branch which is in the circuit and little or no current flows through the controlled rectifier. As the contact arm of the potentiometer is advanced so that the resistance is decreased, the current passing through the controlled rectifier increases until it reaches its maximum value when the resistance of the potentiometer branch in the circuit reaches zero. The increase in the current which passes through the controlled rectifier is not directly proportional to the decrease in resistance of the potentiometer branch and for this reason it is desirable to make this resistance non-linear to provide a uniform relationship between angular movement of the contact arm and variations in the illumination level of the lamp.

When the contact arm reaches the mid-point of the potentiometer, the control switch is then shifted to its other position where it connects the second half-wave rectifier in the parallel with the controlled rectifier. This removes the shunt across the other resistance branch of the potentiometer and the contact arm of the potentiometer is then moved into said resistance branch of the potentiometer with the operation of the controlled rectifier described above being repeated. The control switch and the potentiometer contact arm are preferably coupled together so that the second rectifier will be automatically connected or disconnected as the contact arm of the potentiometer is moved in one direction or the other with respect to the mid-point of the potentiometer.

When the second rectifier is connected in the circuit, it passes voltage to the lamp equal to the maximum voltage previously passing through the controlled rectifier, but of an opposite polarity. Thereafter, as the contact arm is advanced along the resistance branch of the potentiometer now in the circuit, the voltage passing through the controlled rectifier once more increases with the maximum value being reached when the value of the resistance in this branch reaches zero.

In FIG. 3, the wave A represents the positive half-cycle of the voltage which passes through the controlled rectifier when the potentiometer resistance is zero. As explained, this voltage can be set to any point along this wave by the adjustment of the potentiometer. In FIG. 3a, the wave B represents the negative half-cycle of the voltage which passes through the second rectifier with no voltage passing through the controlled rectifier. This is the condition when the second rectifier is initially connected in the circuit. In FIG. 3b, the wave B for the negative half-cycle is shown as before with a partial wave A' representing the positive voltage passing through the controlled rectifier when the potentiometer contact arm is set between the ends of the resistance, in this case at about the middle.

In order to prevent interference at radio frequencies which may be caused by feedback from the control circuit into a house wiring system, a filter consisting of two inductances 42 and 43 which are wound on a common torroidal core 44 may be connected to the lines 23 and 25, respectively, as shown in FIG. 2.

As shown in FIGS. 4 and 5, a unit 45 representing an assembly of control circuit components described above can be connected in either a "two-wire" or a so-called "three-wire" household wiring system. In a two-wire system, as shown in FIG. 4, the terminals of the unit are connected to the ends of the two wires 23' and 27' which run to the wall box 46 from the lamp. In the three-wire system, as shown in FIG. 5, the terminals of the unit are connected in one of the lines; i.e., to the wire 23" which leads to the lamp and to wire 27" which leads to one side of the A.-C. current source. Corresponding numerals have been applied to corresponding parts in the various figures.

It will be understood that various modifications may be made in the embodiments of the invention described and shown herein without departing from the spirit or scope of the invention as defined by the following claims.

I claim:

1. In a circuit for controlling the level of illumination from an incandescent source of light such as a filament type lamp, the combination which comprises a controlled half-wave rectifier having a first side connected to an incandescent source of illumination and a second side connected to one side of a source of alternating current, said rectifier being adapted to pass voltage of one polarity; means for varying the period during which said rectifier is conductive, said means including a potentiometer having a pair of resistance branches connected in series with a tap at their midpoint and a movable contact arm engaging with said resistance branches in sequence, one of said resistance branches being connected at one end to said one side of the source of alternating current and the second side of the half-wave rectifier, said contact arm being connected to the other side of the half-wave rectifier through a network including a resistance and a capacitance, and a voltage-sensitive triggering device connected from the resistance side of the capacitance to a control element of the rectifier; a second half-wave rectifier having one side connected to the incandescent source of light and being adapted to pass voltage of an opposite polarity; and switching means for selectively establishing a circuit connecting the midpoint of the potentiometer to said one side of the source of alternating current and a second circuit connecting the second half-wave rectifier in parallel with the controlled half-wave rectifier.

2. In a circuit for controlling the level of illumination from an incandescent source of light such as a filament type lamp, the combination as defined in claim 1 wherein the resistance branches of the potentiometer are equal in value and are non-linear.

3. In a circuit for controlling the level of illumination from an incandescent source of light, the combination as defined in claim 1 wherein the controlled rectifier and the half-wave rectifier are semi-conductor devices.

4. In a circuit for controlling the level of illumination from an incandescent source of light, the combination as defined in claim 2 which includes filter means for reducing feedback from the rectifiers to the source of alternating current, said filter means includes a pair of filtering elements, one of said filter elements being connected between said one side of the rectifiers and the source of alternating current and the other of said filter elements being connected between the other side of the rectifiers and the source of light.

5. In a circuit for controlling the level of illumination from an incandescent source of light, the combination as defined in claim 4 wherein the filter means includes a torroidal core of magnetic material and the filter elements are inductive coils wound on said core.

6. In a control circuit for regulating the voltage supplied to a non-inductive, resistance type of load from a source of alternating current wherein a half-wave controlled rectifier is connected in series between a source of alternating current and a resistance type of load and said rectifier includes a control element for rendering said rectifier conductive to voltage of a given polarity, the improvement which comprises a circuit for controlling the operation of said rectifier, said control circuit including a potentiometer having a pair of resistance branches, said resistance branches being connected in series and having a midpoint tap, one of said resistance branches having an end connected to one side of a controlled rectifier and one side of a source of alternating current, a switch in circuit with the midpoint tap of the potentiometer and said one side of the source of alternating current, said switch when closed shunting the resistance branch of the potentiometer connected to said one side of the rectifier source of alternating current and connecting the other resistance branch thereto, said potentiometer also including an adjustable contact arm sequentially contacting the resistance branches, a network including a resistance and a capacitance connecting said adjustable contact arm to the other side of the rectifier and a voltage-sensitive triggering device connected between the resistance side of the capacitance and the control element of the rectifier.

7. In a control circuit for regulating the voltage supplied to a non-inductive, resistance type of load, the improvement as defined in claim 6 wherein the resistance branches of the potentiometer have non-linear characteristics.

References Cited by the Examiner
UNITED STATES PATENTS

| | | | |
|---|---|---|---|
| 1,874,777 | 8/1932 | Maser | 323—24 |
| 1,995,810 | 3/1935 | Klemperer | 315—196 |
| 2,451,444 | 10/1948 | Norde | 333—78 X |
| 2,896,125 | 7/1959 | Morton | 315—200 |
| 2,920,240 | 1/1960 | Macklem. | |
| 3,061,744 | 10/1962 | Spira | 307—88.5 X |
| 3,103,618 | 9/1963 | Slater | 313—22 |

OTHER REFERENCES

Solid State Products, Inc., bulletin D-420-02-12-59, December 1959, see pages 15–17.

GEORGE N. WESTBY, *Primary Examiner.*

ARTHUR GAUSS, JOHN W. HUCKERT, *Examiners.*